United States Patent [19]

de Larosiere

[11] Patent Number: 5,031,761
[45] Date of Patent: Jul. 16, 1991

[54] REUSABLE CASE FOR BEVERAGE BOTTLES

[76] Inventor: Pierre J. de Larosiere, 30 Duque de Palmela, 4C 1200, Lisbon, Portugal

[21] Appl. No.: 362,290

[22] Filed: Jun. 6, 1989

[51] Int. Cl.⁵ .................. B65D 1/24; B65D 21/02
[52] U.S. Cl. .................................. 206/203; 206/503; 220/519
[58] Field of Search ............ 206/427, 203, 557, 564, 206/432, 520, 503; 220/21, 70, 519, 518, 516

[56] References Cited

U.S. PATENT DOCUMENTS

| | | | |
|---|---|---|---|
| 2,979,222 | 4/1961 | Levine | 206/203 X |
| 3,106,308 | 10/1963 | Kazimier | 220/519 X |
| 3,391,814 | 7/1968 | Box | 220/519 |
| 3,638,824 | 2/1972 | Sekiguchi et al. | 206/427 X |
| 3,982,654 | 9/1976 | Gottsegen | 206/427 X |
| 4,162,738 | 7/1979 | Wright | 220/519 |
| 4,410,099 | 10/1983 | de Larosiere | 206/427 X |
| 4,615,443 | 10/1986 | Deffner et al. | 206/427 |
| 4,625,864 | 12/1986 | Nigrelli | 206/427 |
| 4,700,836 | 10/1987 | Hammett | 206/427 |
| 4,928,841 | 5/1990 | Arthurs | 220/519 X |

Primary Examiner—David T. Fidei
Assistant Examiner—Jacob K. Ackun, Jr.
Attorney, Agent, or Firm—Dennis H. Lambert

[57] ABSTRACT

A case for holding beverage bottles and the like, in which outwardly and oppositely angled bottle base support platforms in the bottom of the case are arranged to support bottles placed therein so that the longitudinal axes of the bottles are outwardly angularly inclined, defining an "A-frame" type structure when supported in juxtaposed relationship with other cases and bottles, thereby stabilizing the cases and preventing sway or tilting of the bottles. The interior of the case is essentially free of cross partitions or dividers, whereby groups or packages of bottles held together by shrink wrap or the like may be placed in the case. This arrangement also makes it possible to place bottles having a range of different sizes and shapes in the case. In addition, a strapping notch is provided in an outer portion of the case to facilitate strapping of a plurality of cases, further stabilizing a stack of the cases.

14 Claims, 8 Drawing Sheets

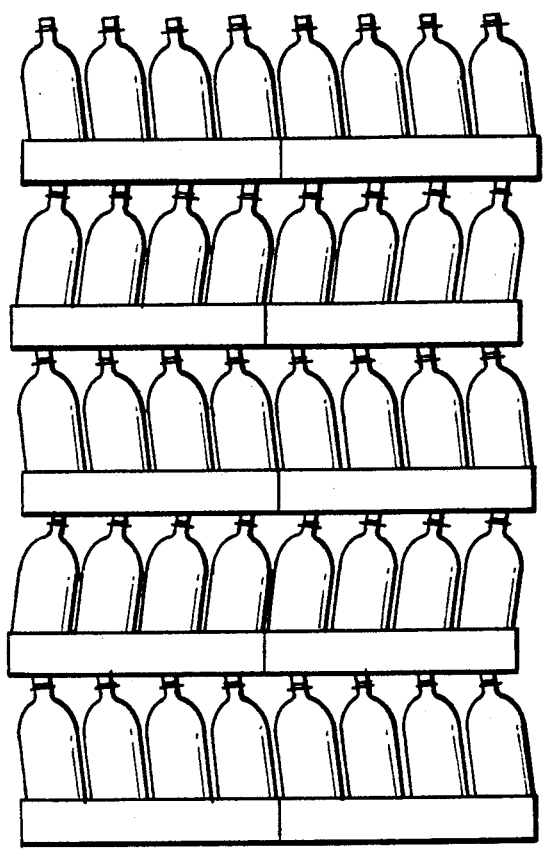
FIG. I
(PRIOR ART)
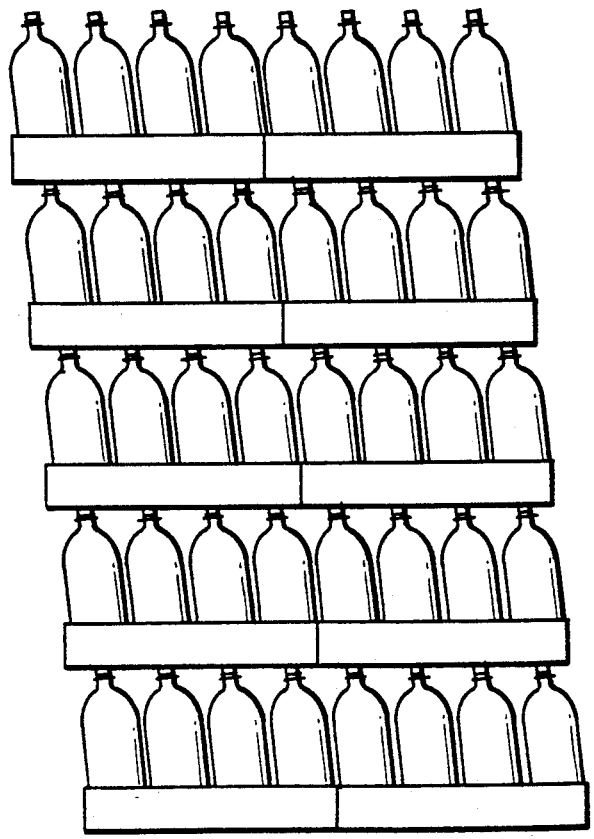
FIG. 2
(PRIOR ART)

REUSABLE CASE FOR BEVERAGE BOTTLES

FIELD OF THE INVENTION

This invention relates to cases for holding articles, and more particularly, to a reusable case for holding beverage bottles and the like, especially two liter bottles.

DESCRIPTION OF THE PRIOR ART

Bottles made from plastic are widely used throughout the beverage industry for retailing carbonated soft drinks and other beverages, particularly in the two liter size. Bottles made of polyethylene terephthalate (PET) have become particularly popular because of their transparency, light weight and low cost. In addition, these bottles are capable of safely withstanding the internal pressures produced by carbonated beverages, and they may be stacked on top on one another when they are supported in cases. Current practice in the industry is to orient the bottles vertically upright in their supporting cases, with the bases of the bottles gripped in complimentally shaped pockets and the sides supported by dividers in the case. In use, a plurality of bottles are packaged in a case and a plurality of cases are stacked on top on one another for storage, shipment, handling and display.

The initial trend was to use corrugated boxes for holding the bottles, but the current trend is toward use of reusable plastic cases. One such prior art case is described in applicant's prior patent, U.S. Pat. No. 4,344,530. This case has a low profile which not only reduces its cost but also enhances its display value. The bases of the bottles are securely gripped by this case, with the longitudinal axes of the bottles oriented vertically and parallel to one another. Thus, a plurality of cases of bottles may be stacked on top of one another in multiple layers, with the axes of the bottles in one layer aligned with the axes of the bottles in adjacent layers. As long as the bottles remain properly vertically oriented in their respective cases the multiple layers of cases are relatively stable.

However, it has been found in practice that the bottles sometimes tend to tilt or sway under a variety of conditions, resulting in instability of the cases when arranged in multiple layers. Such instability can lead to collapse of a stack of cases and bottles, with costly and damaging consequences. The instability of prior art cases generally limits stacking of the cases to two pallets arranged on top of one another, with five layers of cases in each pallet.

Under static load conditions, as when two pallets are stacked on top of one another in a warehouse, the bottles may gradually lean to one side within one or more of the layers. This causes the bottles in the layers directly above and below to lean in the opposite direction until all layers are affected in an accordion-like manner, eventually resulting in collapse of the entire stack. This is particularly true of two-piece bottles in warm weather conditions when the hot-melt adhesive between the bottle and its base softens.

Under dynamic load conditions which might be encountered during transportation, such as, for example, moments of high acceleration, deceleration, vehicle tilting or centrifugal force due to vehicle turning, the swaying latitude of the bottles (the distance a bottle can be made to sway within the case) added to case slippage (the distance a case will slip over the case below it) will be compounded at each level, resulting in dangerous shifting of the top layers. This condition may also lead to collapse of the entire stack, and/or will result in label scuffing and closure abrasion.

All prior art cases known to applicant are subject to the instabilities discussed above, and this lack of stability has been a major deterrent to use of such cases by many bottlers in spite of the advantages in economy and enhanced display functions of such low profile, reusable plastic cases.

Efforts have been made in the prior art to improve the stability of such display cases by providing secure gripping and support of the bottles within the case to minimize the swaying or tilting of the bottles. However, this solution makes the case suitable for use with only a specific bottle design and size. There is a growing tendency in the industry to utilize one-piece bottle designs as opposed to the two-piece design currently in widespread use. These new bottle designs have different base shapes and sizes, thereby precluding or decreasing the gripping action of existing cases on the bases of the bottles and leading to unacceptable instability when the cases are stacked in multiple layers.

Moreover, it is not possible to use present cases with packages of shrink-wrapped bottles because of the dividers used between bottles in such cases.

Further, conventional cases are constructed so that they may be stacked and cross-stacked with other cases, and include bottom structure which contacts the ground or floor on which the case rests. This bottom structure is susceptible to being marred or scratched during use, giving rise to the potential of damaging the closures on subadjacent bottles when one case is slid relative to another case.

Accordingly, there is a need for a reusable plastic beverage case which is stable when stacked in multiple layers, which permits use with multiple bottles packaged together as a unit, which is capable of holding bottles of various shapes and sizes, and which has bottom structure which eliminates the potential of damage to closure caps on bottles in subadjacent cases when the cases are moved laterally relative to one another.

SUMMARY OF THE INVENTION

Therefore, it is an object of the present invention to provide a case for holding containers of beverage or the like, in which the case provides a stable structure when stacked in multiple layers with other cases.

Another object of the invention is to provide a case for holding a plurality of beverage bottles packaged or wrapped together.

A further object of the invention is to provide a case for holding a plurality of beverage bottles, in which the case is adapted to hold bottles of different base dimensions and shapes.

Yet another object of the invention is to provide a case for holding a plurality of beverage bottles, in which provision is made on the case for strapping together a plurality of cases.

A still further object of the invention is to provide a reusable plastic case for supporting a plurality of beverage bottles at an angle to one another to prevent swaying or tilting of the bottles and thereby imparting stability to the case when stacked in multiple layers with other like cases.

Another object of the invention is to provide a case for holding beverage bottles, in which the case has a multi-level bottom including a supporting structure for supporting the case on a surface so that damage to the supporting structure is not likely to lead to damage to closures on subadjacent bottle closures when one case is moved laterally relative to another case stacked therewith.

These and other objects and advantages of the invention are accomplished by a case in which outwardly and oppositely angled bottle base support platforms in the bottom of the case are arranged to support bottles placed therein so that the longitudinal axes of the bottles define an "A-frame" type structure when supported in juxtaposed relationship with other cases and bottles, thereby stabilizing the cases and preventing sway or tilting of the bottles. The interior of the case is essentially free of cross partitions or dividers, whereby groups or packages of bottles held together by shrink wrap or the like may be placed in the case. This arrangement also makes it possible to place bottles having a range of different sizes and shapes in the case. In addition, a strapping notch is provided in an outer portion of the case to facilitate strapping of a plurality of cases, further stabilizing a stack of the cases.

BRIEF DESCRIPTION OF THE DRAWINGS

The foregoing as well as other objects and advantages of the invention will become apparent from the following detailed description when considered with the accompanying drawings wherein like reference characters designate like parts throughout the several views, and wherein:

FIG. 1 is a somewhat schematic side view in elevation of a stack of prior art cases and bottles under static load, showing how opposite lean of the bottles in adjacent layers can lead to instability of the stack;

FIG. 2 is a somewhat schematic side view in elevation of a stack of prior art cases and bottles under dynamic load, showing how sway of the bottles can lead to instability of the stack of cases;

DETAILED DESCRIPTION OF THE PREFERRED EMBODIMENTS

Figure 3:
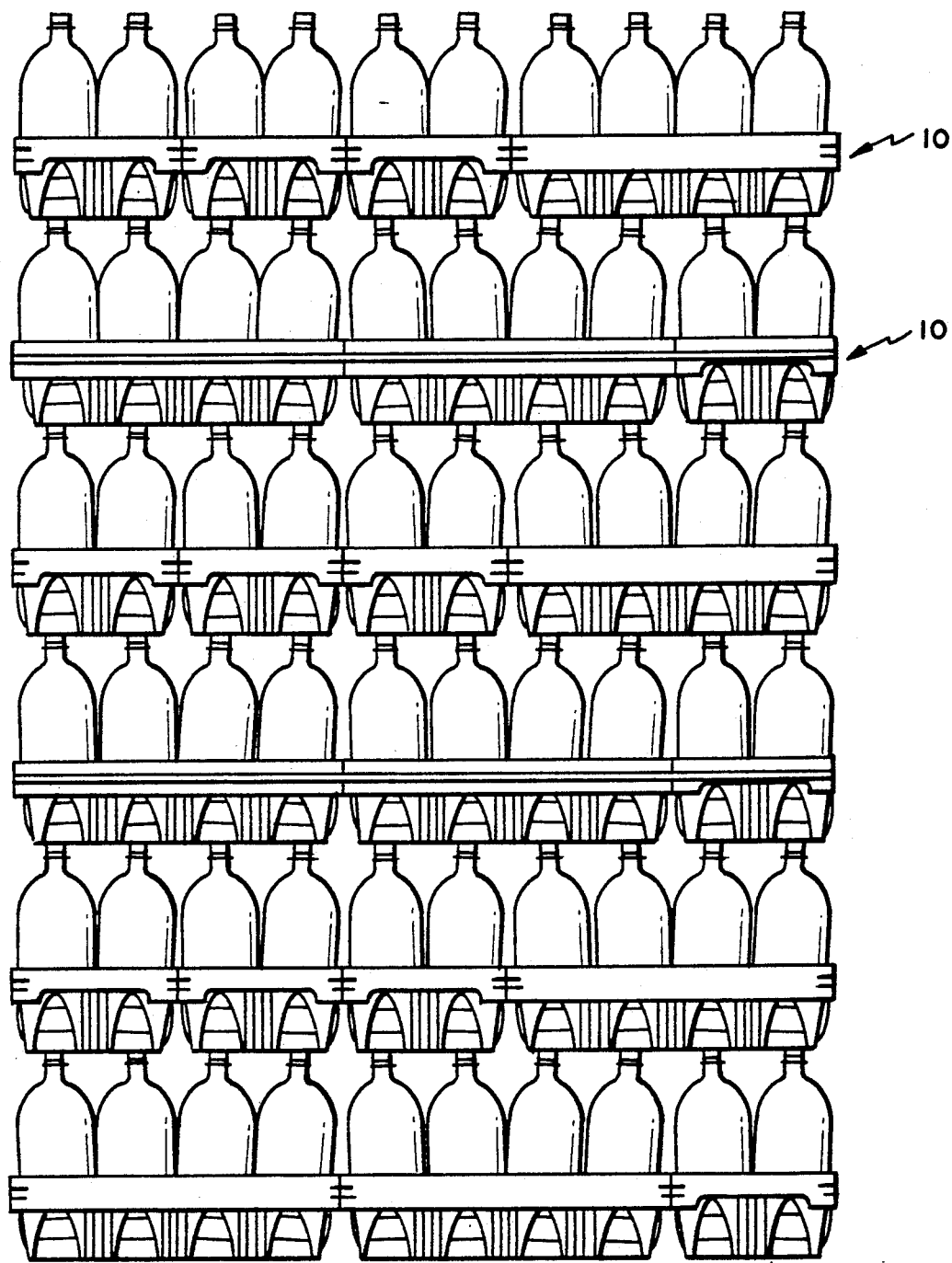
FIG. 3 is a somewhat schematic side view in elevation of a stack of cases and bottles in accordance with the invention, showing how the different angular orientations of the bottles imparts stability to the stack.
Figure 5:
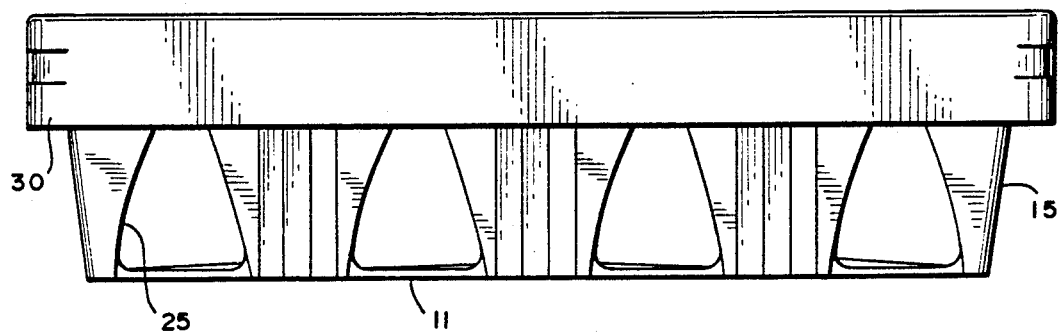
FIG. 5 is a side view in elevation of the case of FIG. 4.

Referring more specifically to the drawings, a case in accordance with the invention is indicated generally at 10. The case comprises a bottom wall 11, opposite side walls 12 and 13, opposite end walls 14 and 15, and an open top. The interior of the case is substantially uninterrupted, except for a transverse web 16 which extends across the middle of the bottom wall, dividing the case into two substantially equal and essentially square longitudinally adjacent sections 17 and 18.

Figure 4:
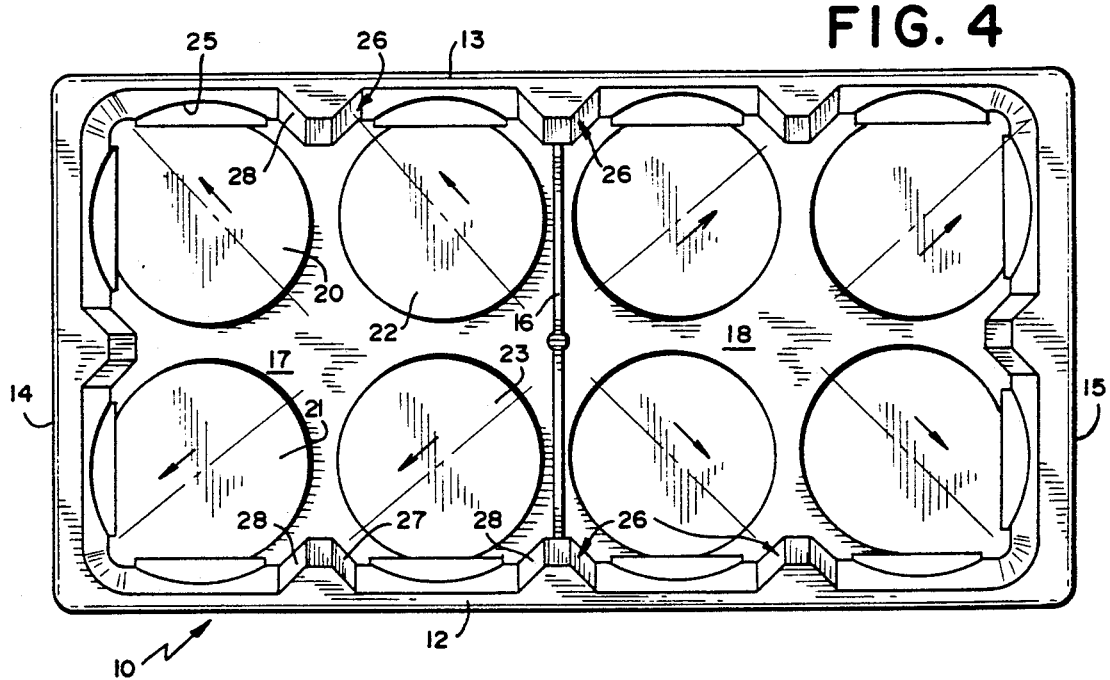
FIG. 4 is a top plan view of a case in accordance with the invention.
Figure 6:
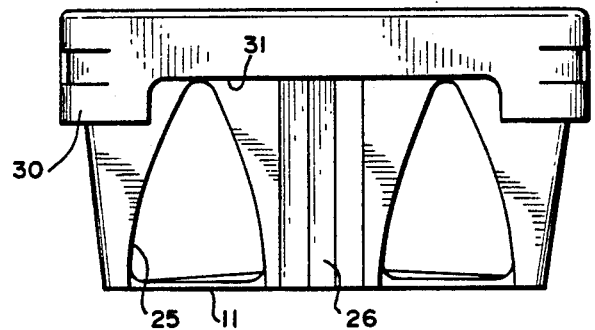
FIG. 6 is an end view in elevation of the case of FIG. 4.
Figure 7:
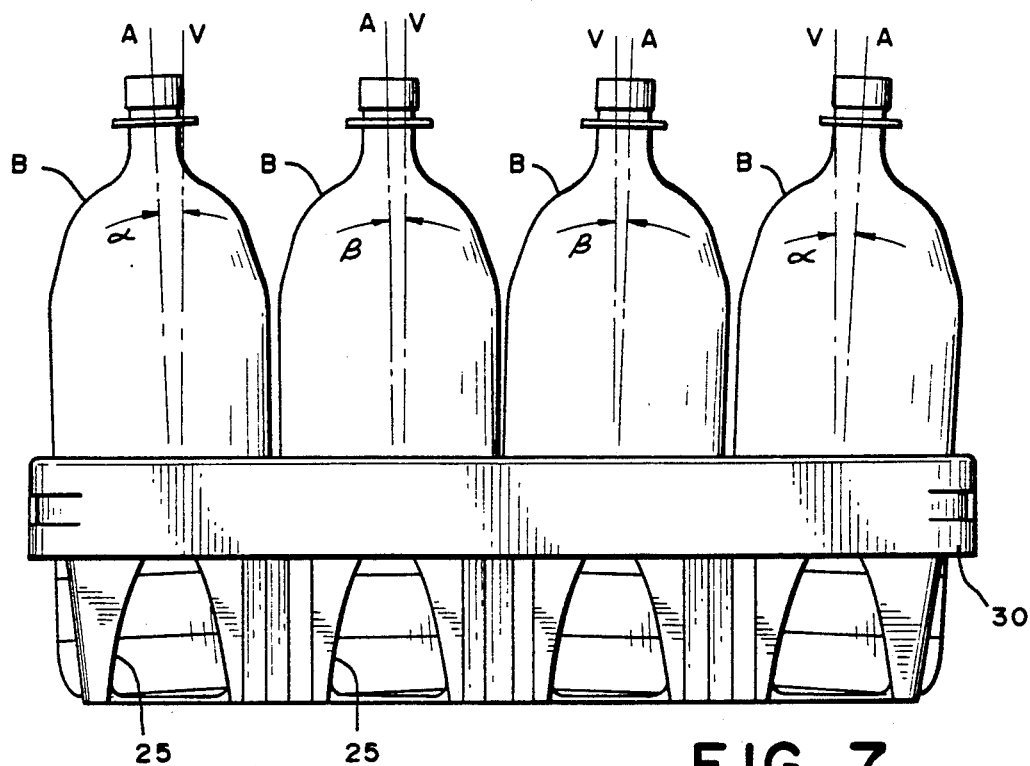
FIG. 7 is a side view in elevation of the case of FIG. 4, showing the orientation of bottles placed therein.
Figure 8:
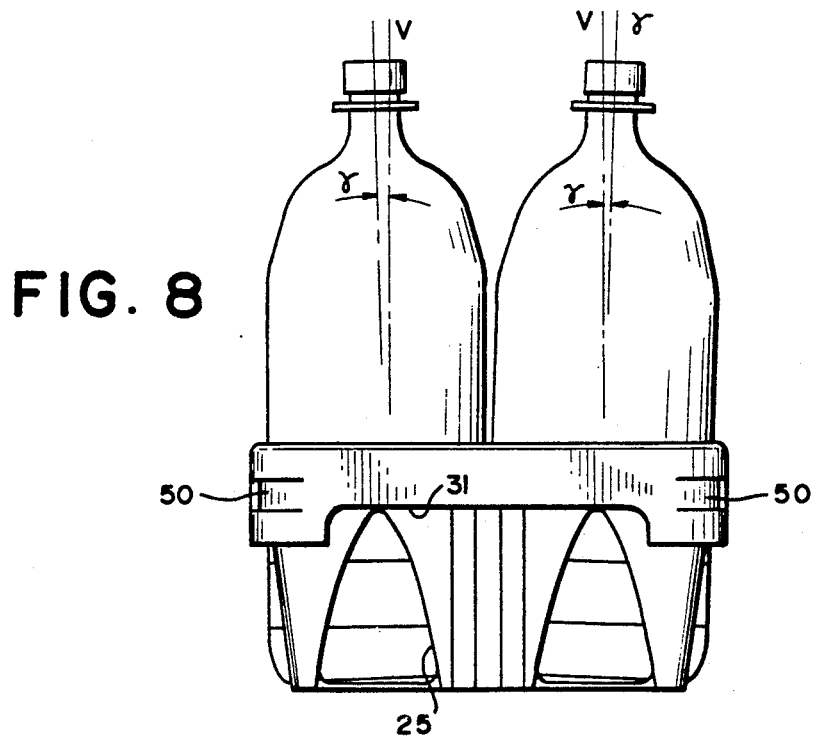
FIG. 8 is an end view in elevation of the case of FIG. 4, showing the orientation of bottles placed therein.

Four generally circular bottle support platforms 20, 21, 22 and 23 are molded in the bottom wall in each of the sections 17 and 18. These platforms are elevated at one side, with the plane of the platform tilted or inclined in a direction along an imaginary line extending outwardly toward the end of the case at an angle of about 45° to the longitudinal axis of the case. Further, the platforms 20 and 21 situated in the outer end corners of each section are elevated or inclined approximately twice as much as those platforms 22 and 23 situated at the inner end corners of each section. In a specific construction, for example, the planes of the platforms 20 and 21 are inclined at an angle of about 4° to the plane of the bottom wall 11, while the planes of the platforms 22 and 23 are inclined at an angle of about 2° to the plane of the bottom wall. Thus, bottles supported in the case on the platforms will be inclined from the vertical outwardly toward the sides and ends of the case, as seen in FIGS. 7 and 8. Further, as seen best in FIG. 4, the diameter of each platform is such that its outer circumference intersects the adjacent outer edge of the bottom wall 11, whereby a projected chord or segment of each circular platform would extend beyond the side wall if the platform did not terminate at the edge of the bottom wall 11.

The side walls 12 and 13 and end walls 14 and 15 are slightly outwardly flared or inclined and have cut-outs 25 positioned at the areas of intersection between the bottle support platforms and the outer edges of the bottom wall. When a bottle is placed on the platform in the case, its side wall projects beyond the truncated support platform and into the cut-out area. The cut-out is arcuately shaped and is designed to closely conform to the contour of that part of the bottle projecting into the cut-out, and serves to restrict movement of the bottle in the case.

In the areas extending between the cut-outs the side wall is formed with inset reinforcing columns 26 having a generally trapezoidal cross-sectional shape, and defining angularly disposed abutment walls 27 and 28 which also serve to contact and limit movement of the bottles supported on the platforms. Thus, these columns not only impart rigidity to the case side wall but also assist in limiting movement of the bottles supported in the case. As a further aid in limiting movement of the bottles, the outer corners of the case, at the juncture between the side walls and the end walls, are formed with inset abutments 29.

The upper edge of the side and end walls is turned downwardly to form a relatively wide, vertically extending flange 30 which reinforces the case and defines a bumper for contact with adjacent cases. In addition, this flange is undercut at 31 at the ends of the case to provide a hand grip area for lifting the case.

Figure 9:
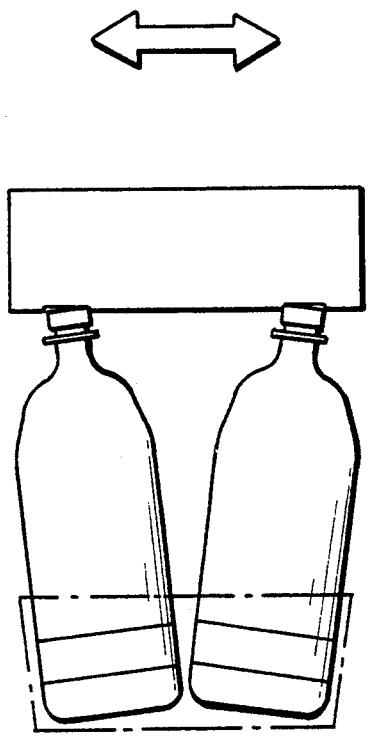
FIG. 9 is a schematic side view depicting how the angular orientation of bottles in one case interacts with a superadjacent case to define an "A-frame" structure, imparting lateral stability to the stacked cases and bottles.
Figure 10:
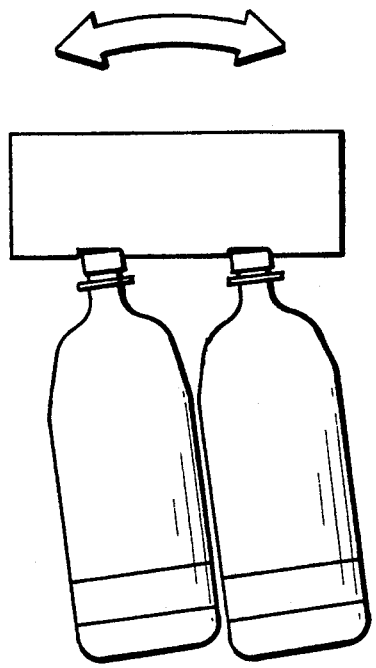
FIG. 10 is a schematic side view depicting how the conventional arrangement of bottles in conventional cases leads to sway or tilting of the bottles in one direction, resulting in, instability of the stack of cases.
Figure 11:
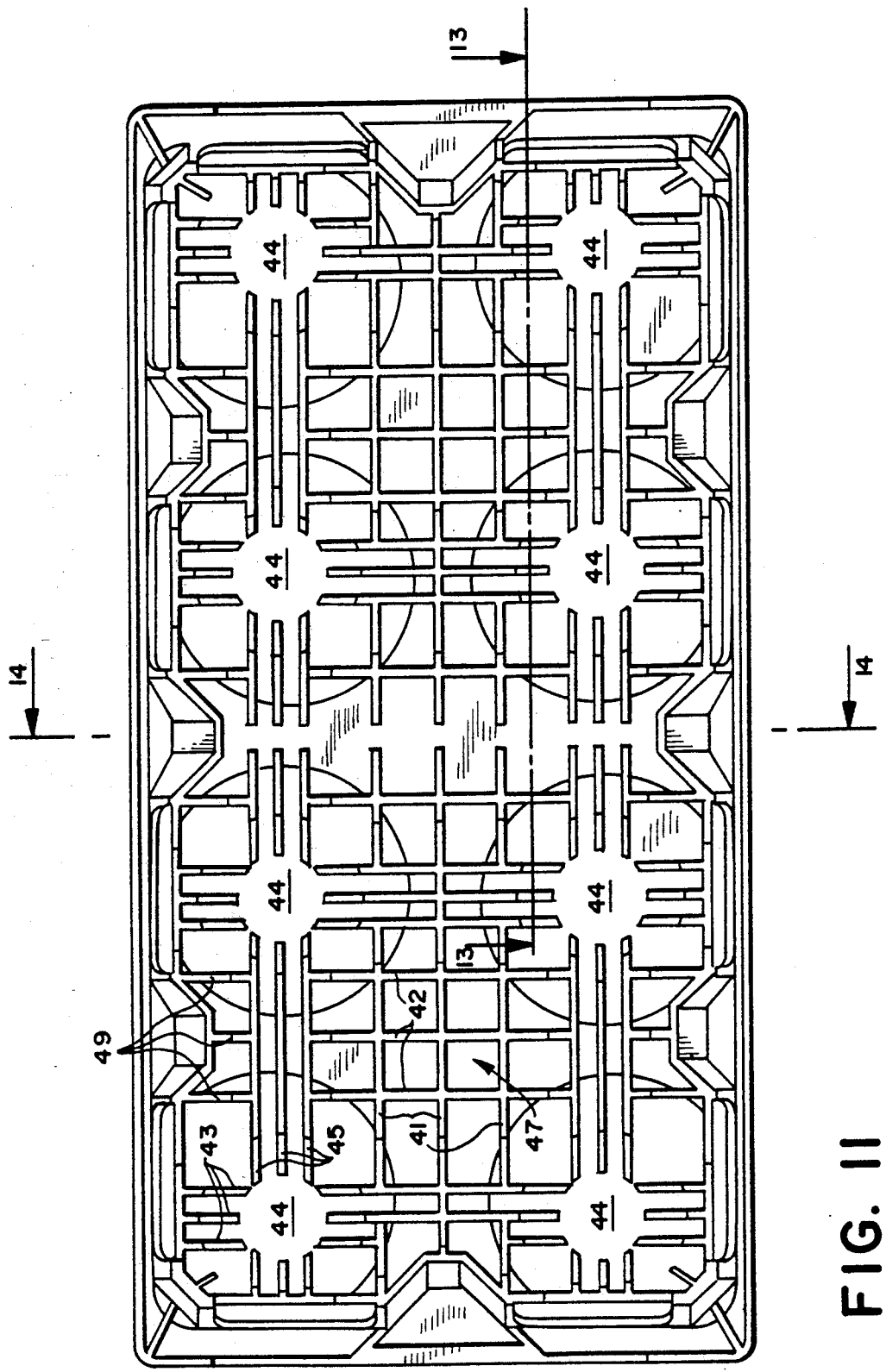
FIG. 11 is a bottom plan view of the case of the invention.
Figure 12:
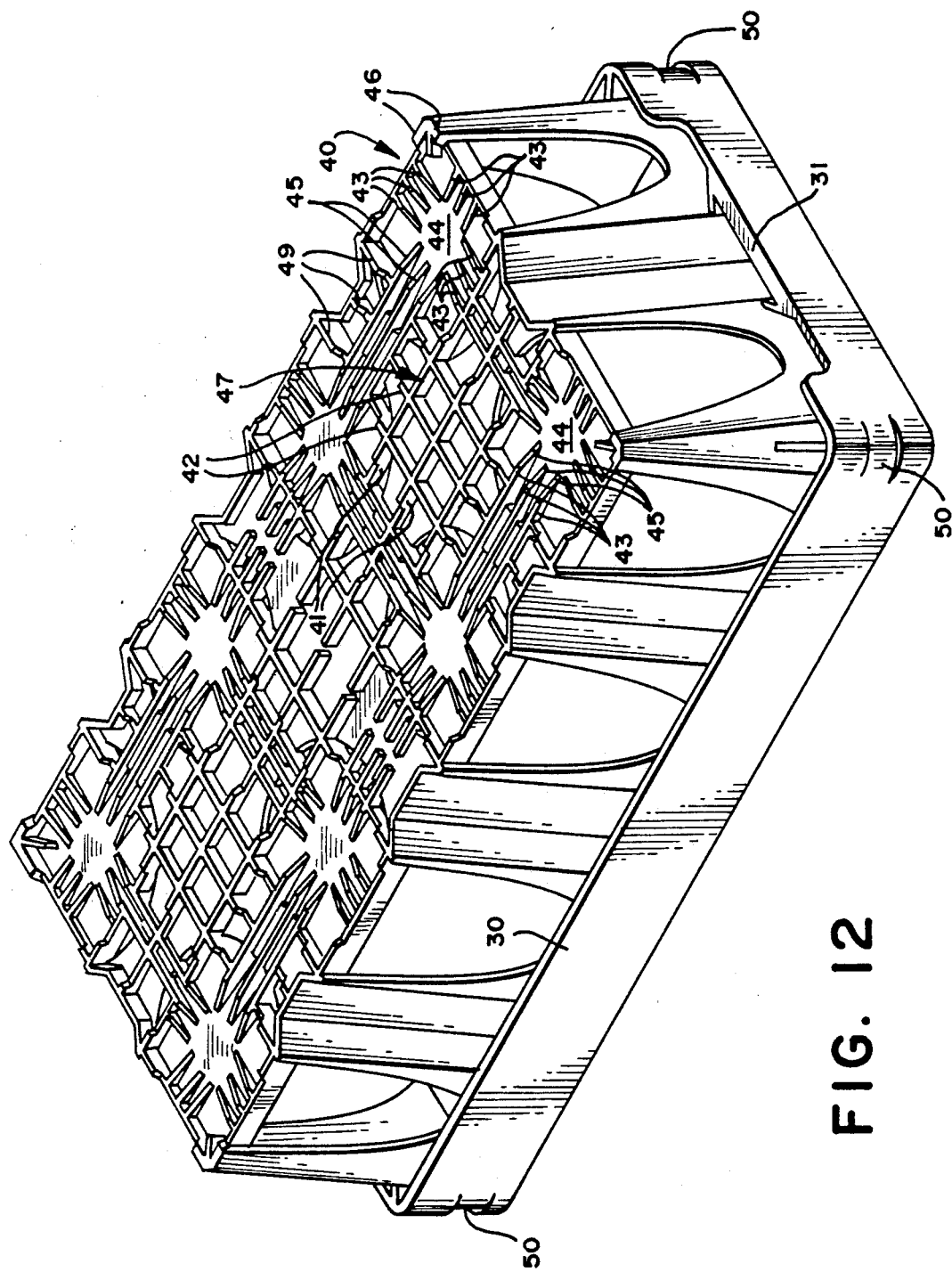
FIG. 12 is a bottom perspective view of a portion of the case of the invention, showing the multi-level structure of the bottom.
Figure 13:
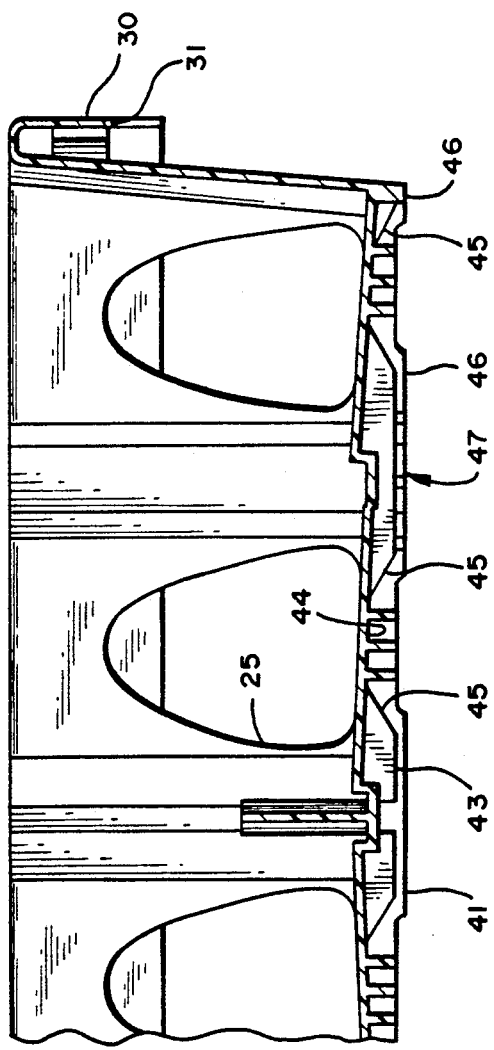
FIG. 13 is a longitudinal sectional view of the case of the invention, taken along line 13—13 in FIG. 11.
Figure 14:
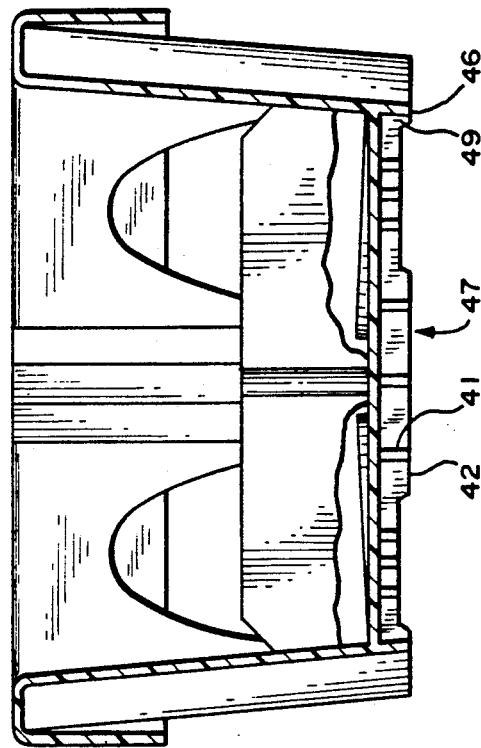
FIG. 14 is a transverse sectional view of the case of the invention, taken along line 14—14 in FIG. 11.

Thus, as seen best in FIGS. 7 and 8, bottles "B" placed in the case of the invention are tilted so that their longitudinal axes "A" are displaced from the vertical "V". As noted previously herein, the two bottles at the end of the case are tilted longitudinally outwardly at a greater angle alpha than are the two bottles toward the center of the case, which are tilted at an angle beta. Moreover, the bottles are all tilted laterally outwardly an angle gamma, as shown in FIG. 8. When stacked with other cases, the bottles and cases thus define an "A-frame" structure (see FIG. 9) which resists lateral shifting of the cases relative to one another. In contrast, bottles packaged in accordance with the prior art tend to lean in one direction as shown in FIG. 10, resulting in instability of the cases and leading to their eventual collapse.

Another important feature of the case of the invention is the multi-level bottom structure 40. As seen best in FIGS. 11–14, this structure includes a plurality of longitudinally and laterally extending ribs 41 and 42, respectively. These ribs include "service" ribs 43 extending across the width and length of the case, defining tracks along which the closure caps of bottles in a subadjacent case slide when the cases are moved laterally with respect to one another. These "service" ribs or tracks are interrupted at a plurality of equi-distantly spaced apart "home" positions 44 for receiving the caps of bottles in subadjacent cases. The ends of the "service" ribs 43 leading to and from these home positions are sloped or inclined, defining ramps 45 for guiding the closure caps into and out of the home positions.

The foregoing home positions and service ribs define two levels of the multilevel bottom structure. A third level is defined by the remaining ribs, including a peripheral flange 46 extending around the bottom of the case, interrupted only at those places where the service tracks extend outwardly through the marginal edge of the bottom, and rectangular grids 47 and 48 of ribs extending in the areas between the service tracks. In addition, peripheral support ribs 49 are formed in alignment with the ribs forming the grids, and extend in the area between the peripheral flange 46 and the service tracks. This third level of ribs defines a support structure for the case when it is placed on a supporting surface, and prevent damage to the service tracks by eliminating contact between the supporting surface and the ribs forming the service tracks. In prior art structures, that portion of the case bottom along which the closure caps of subadjacent bottles are caused to slide when moving one case relative to another frequently becomes nicked or otherwise damaged, and these irregularities can then scratch or otherwise damage the closure caps. The case support structure defined by the multilevel bottom of the invention avoids this potential damage by making the service ribs recessed relative to the support ribs so that the service ribs cannot contact the ground or other surface on which the case may be placed.

Because of the absence of cross partitions or dividers in the interior of the case of the invention, it is also possible to use it to hold pre-packaged groups of bottles held together by means such as a shrink wrap, for example, and new bottle designs having variations in base dimensions and shape can be placed in the case since there is no need to firmly grip the base of the bottle as in prior art cases.

Further, a strapping notch 50 is provided in each corner of the case in the vertical flange 30, whereby a plurality of cases may be strapped together, further stabilizing a stack of cases.

Although the invention has been described with reference to a particular embodiment, it is to be understood that this embodiment is merely illustrative of the application of the principles of the invention. Numerous modifications may be made therein and other arrangements may be devised without departing from the spirit and scope of the invention.

I claim:

1. A case for holding beverage bottles, wherein:
said case has a bottom wall with opposite side edges, opposite side walls extending upwardly from the side edges of the bottom wall, and an open top, said case further having a vertical center line extending perpendicular from said bottom wall; and
a plurality of inclined bottle supports are formed in the bottom wall for engaging and supporting beverage bottles in the case, said inclined bottle supports each adapted to engage and support the bottom of a beverage bottle so that the longitudinal axis of each bottle is held at an angle of inclination with respect to the vertical center line of the case, said supports being disposed so that the longitudinal axes of bottles engaged on different supports on opposite sides of said center line are inclined in different and opposite directions with respect to said center line, whereby when a plurality of cases full of bottles are stacked on top of one another, the oppositely oriented bottles resist laterally directed forces imposed thereon and impart structural stability to the stacked cases.

2. A case as claimed in claim 1, wherein:
the bottom wall of the case is substantially planar; and
the bottle supports each comprise a planar platform formed in the bottom wall and that is tilted with respect to the plane of the bottom wall.

3. A case as claimed in claim 2, wherein:
the case has a longitudinal center axis and a transverse center axis; and
the bottle support platforms on opposite sides of the longitudinal and transverse center axes are angled or tilted outwardly away from said axes and oppositely to one another.

4. A case as claimed in claim 3, wherein:
those bottle support platforms nearest the opposite ends of the case are tilted outwardly a greater angle of inclination than those bottle support platforms nearest the transverse center line of the case.

5. A case as claimed in claim 4, wherein:
the case is transversely divided into two equal sections each having four uniformly spaced bottle support platforms defined therein; and
said bottle support platforms are each angled outwardly in both a longitudinal direction and a transverse direction.

6. A case as claimed in claim 1, wherein:
the interior of the case is substantially free of dividers or partitions, whereby pre-packaged groups of bottles may be placed in the case.

7. A case as claimed in claim 1, wherein:
the case has opposite side walls and opposite end walls, said inclined bottle supports comprising raised platforms which intersect at a peripheral edge portion thereof with the side and end walls, and the side and end walls having cut-outs at the areas of intersection, said cut-outs being shaped complimentally to that portion of a bottle received on the platform and projecting beyond the edge of the case bottom, whereby the bottle is restrained against movement by contact with the edges of the cut-out.

8. A case as claimed in claim 1, wherein:
the case has a multilevel bottom structure including one level defining case support means for supporting the case on a supporting surface, and another level recessed from said one level and defining slides along which closure caps of bottles in subadjacent cases can be slid when moving one case relative to another, said different levels for the support structure and the slides serving to protect the slides from damage due to contact with a supporting surface on which the case rests.

9. A case as claimed in claim 8, wherein:
the case has opposite side walls and opposite end walls, said inclined bottle supports comprising raised platforms which intersect at a peripheral edge portion thereof with the side and end walls, and the side and end walls having cut-outs at the areas of intersection, said cut-outs being shaped complimentally to that portion of a bottle received on the platform and projecting beyond the edge of the case bottom, whereby the bottle is restrained against movement by contact with the edges of the cut-out.

10. A case as claimed in claim 9, wherein:
the interior of the case is substantially free of dividers or partitions, whereby pre-packaged groups of bottles may be placed in the case.

11. A case as claimed in claim 10, wherein:
strapping notches are provided on an outer surface portion of the case for receiving a strap to strap together a plurality of said cases.

12. A case for holding beverage bottles, in which the case has a multilevel bottom structure including a first level defining case support means for supporting the case on a supporting surface, and a second level recessed from said first level and defining slides along which closure caps of bottles in subadjacent cases can be slid when moving one case relative to another, said first level comprising a plurality of spaced ribs extending longitudinally and laterally relative to the case bottom and defining a surface for maintaining the case on a support surface, and said second level including a plurality of spaced ribs extending longitudinally and laterally relative to the case bottom and having sloped ends terminating in home positions on a third level further recessed from said first level for engaging the top of a bottle supported in a subadjacent case, said first level protecting said second and third levels against damaging contact with a support surface on which the case may be rested, whereby the slides defined by the second level are not marred by contact with the support surface, and the caps of bottles engaged with the slides are thereby protected against damage that might be caused by nicks and other damage that would otherwise occur to the slides and home positions.

13. A case as claimed in one of claims 1, 12 or 6, wherein:
strapping notches are provided on an outer surface portion of the case for receiving a strap to strap together a plurality of said cases.

14. A case as claimed in any one of claims 1, 12 or 6, wherein:
the bottom of the case has a plurality of recessed areas on its outer surface defining home positions for receiving bottle caps of bottles in a subadjacent case.

* * * * *